United States Patent
Banat et al.

(10) Patent No.: US 10,759,883 B2
(45) Date of Patent: *Sep. 1, 2020

(54) PROCESS FOR THE POLYMERIZATION OF OLEFINS

(71) Applicant: SABIC Global Technologies B.V., Bergen op Zoom (NL)

(72) Inventors: Yahya Banat, Geleen (NL); Ahmad Abdullah Alshaiban, Riyadh (SA); Osamah Al-Humaidan, Riyadh (SA)

(73) Assignee: SABIN GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/750,956

(22) PCT Filed: Jul. 27, 2016

(86) PCT No.: PCT/EP2016/067901
§ 371 (c)(1),
(2) Date: Feb. 7, 2018

(87) PCT Pub. No.: WO2017/025330
PCT Pub. Date: Feb. 16, 2017

(65) Prior Publication Data
US 2018/0251582 A1 Sep. 6, 2018

Related U.S. Application Data

(60) Provisional application No. 62/261,505, filed on Dec. 1, 2015.

(30) Foreign Application Priority Data

Aug. 7, 2015 (EP) .................................... 15180265

(51) Int. Cl.
C08F 2/34 (2006.01)
C08F 10/06 (2006.01)
B01J 8/18 (2006.01)
C08F 110/06 (2006.01)
C08F 210/02 (2006.01)
C08F 10/02 (2006.01)
C08F 110/02 (2006.01)
C08F 210/06 (2006.01)
C08F 10/00 (2006.01)
(Continued)

(52) U.S. Cl.
CPC ............. C08F 10/06 (2013.01); B01J 8/08 (2013.01); B01J 8/1818 (2013.01); B01J 8/1827 (2013.01); B01J 8/1836 (2013.01); B01J 8/1863 (2013.01); B01J 8/20 (2013.01); C08F 2/01 (2013.01); C08F 2/34 (2013.01); C08F 10/00 (2013.01); C08F 10/02 (2013.01); C08F 110/02 (2013.01); C08F 110/06 (2013.01); C08F 210/02 (2013.01); C08F 210/06 (2013.01); B01J 2208/00017 (2013.01); B01J 2208/00176 (2013.01); B01J 2208/00274 (2013.01); B01J 2208/00991 (2013.01); B01J 2219/00033 (2013.01)

(58) Field of Classification Search
CPC combination set(s) only.
See application file for complete search history.

(56) References Cited

U.S. PATENT DOCUMENTS 4,543,399 A 9/1985 Jenkins, III et al.
4,588,790 A 5/1986 Jenkins, III et al.
(Continued)

FOREIGN PATENT DOCUMENTS

EP 0019330 A1 11/1980
EP 1273595 A1 1/2003
(Continued)

OTHER PUBLICATIONS

Hamielec et al.;"Polymerization Reaction Engineering—Metallocene Catalysts", Prog. Polym. Sci., 1996, vol. 21, pp. 651-706.
(Continued)

Primary Examiner — Monique R Peets
(74) Attorney, Agent, or Firm — Cantor Colburn LLP

(57) ABSTRACT

The present invention relates to a process for the continuous preparation of a polyolefin in a reactor from one or more α-olefin monomers of which at least one is ethylene or propylene, wherein the reactor comprises a fluidized bed, an expanded section located at or near the top of the reactor, a distribution plate located at the lower part of the reactor and an inlet for a recycle stream located under the distribution plate wherein the process comprises—feeding a polymerization catalyst to the fluidized bed in the area above the distribution plate—feeding the one or more α-olefin monomers to the reactor—withdrawing the polyolefin from the reactor—circulating fluids from the top of the reactor to the bottom of the reactor, wherein the circulating fluids are compressed using a compressor and subsequently cooled using a heat exchanger to form a cooled recycle stream comprising liquid, and wherein the cooled recycle stream is introduced into the reactor using the inlet for the recycle stream wherein a part of the cooled recycle stream is drawn to form a liquid comprising stream, wherein the liquid comprising stream is introduced into the expanded section during at least part of the polymerization process, and wherein the liquid comprising stream is brought into contact with at least part of the interior surface of the expanded section.

20 Claims, 6 Drawing Sheets

(51) Int. Cl.
*B01J 8/08* (2006.01)
*C08F 2/01* (2006.01)
*B01J 8/20* (2006.01)

(56) References Cited

U.S. PATENT DOCUMENTS

| | | | |
|---|---|---|---|
| 4,771,024 | A | 9/1988 | Nestlerode et al. |
| 4,798,081 | A | 1/1989 | Hazlitt et al. |
| 4,866,022 | A | 9/1989 | Arzoumanidis et al. |
| 4,933,149 | A | 6/1990 | Rhee et al. |
| 5,093,415 | A | 3/1992 | Brady, III et al. |
| 5,100,981 | A | 3/1992 | Schreck et al. |
| 5,192,732 | A | 3/1993 | Duranel et al. |
| 5,414,063 | A | 5/1995 | Seeger et al. |
| 5,428,118 | A | 6/1995 | Painter et al. |
| 5,432,244 | A | 7/1995 | Rebhan |
| 5,436,304 | A | 7/1995 | Griffin et al. |
| 5,548,042 | A | 8/1996 | Goode |
| 5,652,303 | A | 7/1997 | Ishimaru et al. |
| 5,844,046 | A | 12/1998 | Ohgizawa et al. |
| 5,849,654 | A | 12/1998 | Fushimi et al. |
| 5,869,418 | A | 2/1999 | Iiskola et al. |
| 6,066,702 | A | 5/2000 | Ro et al. |
| 6,111,039 | A | 6/2000 | Miro et al. |
| 6,087,459 | A | 7/2000 | Miro et al. |
| 6,127,303 | A | 10/2000 | Ebara et al. |
| 6,133,385 | A | 10/2000 | Shamshoum et al. |
| 6,184,328 | B1 | 2/2001 | Yanagihara et al. |
| 6,303,698 | B1 | 10/2001 | Ushioda et al. |
| 6,391,985 | B1 | 5/2002 | Goode et al. |
| 6,799,568 | B2 | 10/2004 | Zakharov et al. |
| 6,825,146 | B2 | 11/2004 | Kilty et al. |
| 7,781,363 | B2 | 8/2010 | Chen et al. |
| 2005/0137364 | A1* | 6/2005 | Cai ................... C08F 210/16 526/68 |
| 2005/0182207 | A1 | 8/2005 | Singh et al. |
| 2009/0118118 | A1 | 5/2009 | Chen et al. |
| 2018/0230251 | A1 | 8/2018 | Banat et al. |
| 2020/0087421 | A1 | 3/2020 | Banat et al. |

FOREIGN PATENT DOCUMENTS

| | | | |
|---|---|---|---|
| EP | 1764378 | A1 | 3/2007 |
| JP | S61203105 | A | 9/1986 |
| WO | 9632427 | A1 | 10/1996 |
| WO | 9920663 | A2 | 4/1999 |
| WO | 9958585 | A1 | 11/1999 |
| WO | 03068828 | A1 | 8/2003 |
| WO | 2007134851 | A1 | 11/2007 |
| WO | 2013074087 | A1 | 5/2013 |
| WO | WO2013/074087 | * | 5/2013 |
| WO | 2015078815 | A1 | 6/2015 |
| WO | 2015078816 | A1 | 6/2015 |

OTHER PUBLICATIONS

International Search Report for International Application No. PCT/EP2016/067901; dated Sep. 22, 2016; 4 pages.

Peacock, "Handbook of Polyethylene: Structures, Properties, and Applications", 2000, pp. 61-62.

Pullukat, T. et al.; "Silica-Based Ziegler-Natta Catalysts: A Patent Review"; Catal. Rev.-Sci. Eng.; vol. 41, Nos. 3 & 4; 1999; pp. 389-428.

Wild et al., "Determination of Branching Distributions in Polyethylene and Ethylene Copolymers," Journal of Polymer Science: Polymer Physics Edition, vol. 20, 441-455 (1982).

Written Opinion of the International Search Report for International Application No. PCT/EP2016/067901; dated Sep. 22, 2016; 5 pages.

Japanese Patent No. S61203105; Date of Publication: Sep. 9, 1986; Abstract Only, 1 page.

* cited by examiner

PROCESS FOR THE POLYMERIZATION OF OLEFINS

CROSS REFERENCE TO RELATED APPLICATIONS

This application is a 371 of International Application No. PCT/EP2016/067901, filed Jul. 27, 2016, which claims priority to European Patent No. 15180265.9, filed Aug. 7, 2015 and U.S. Application No. 62/261,505 filed Dec. 1, 2015, all of which are incorporated herein by reference in their entirety.

The present invention relates to a process for the preparation of a polyolefin in a reactor from one or more α-olefin monomers of which at least one is ethylene or propylene. The invention also relates to polyolefins obtained or obtainable by said process and to a reaction system for operating said process.

Processes for the homopolymerization and copolymerization of olefins for example to produce homopolypropylene or a propylene-ethylene copolymer in the gas phase are well known in the art. Typically, in fluidized bed polymerization process, the solid particulates are projected upward into the expanded section through the bursting of rising gas bubbles at the surface of the fluidized bed, and most of these particulates are typically returned to the fluidized bed by gravity as their velocity dissipates in the lower gas velocities of the expanded section. A small quantity of fine powder, or fines, is elutriated out of the projected particulates and does not return directly to the fluid bed by gravity. These fines are either conveyed upward by the cycle gas to the reactor gas outlet, or settle on surfaces of the expanded section through gravity or through particle attraction forces such as electrostatic attraction.

Disengaged fines that settle on the expanded section surfaces are known to accumulate as layers of fines under certain conditions. Settled fines are generally reactive and continue to polymerize in place at a rate related to the concentration of active catalyst contained in the fines. Such layers typically build to sufficient thicknesses in a short period of time that the forces holding them in place are overcome by gravity and the layers then slide harmlessly back into the fluid bed. Larger particulates from the fluid bed may also be projected onto the layers of fines, especially at lower elevations near the bed surface, causing all or part of the layer to be released and to then re-enter the bed through gravity. The cycle of fines buildup and return to the bed occurs repetitively in normal operation.

It is well known that the production rate (i.e. the space time yield in terms of weight of polymer produced per unit volume of reactor space per unit time) in commercial gas fluidized bed reactors of the afore-mentioned type is restricted by the maximum rate at which heat can be removed from the reactor. The rate of heat removal can be increased for example, by increasing the velocity of the recycle gas and/or reducing the temperature of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practice is normally determined by the temperature of the industrial cooling water available on site. Refrigeration can be employed if desired, but this adds to the production costs. Thus, in commercial practice, the use of cooled recycle gas as the sole means of removing the heat of polymerization from the gas fluidized bed polymerization of olefins has the disadvantage of limiting the maximum production rates obtainable.

Conventionally, gas phase polymerization processes typically run continuously, therefore the temperature of the fluidized bed reactor is controlled to an essentially isothermal level through continuously removing the heat of polymerization by circulating the gas exiting from the fluidized bed to a condenser/heat exchanger outside the reactor and recirculating the cooled gas stream back into the reactor. When the temperature of the recirculating stream introduced or recycled into the fluidized bed polymerization reactor is above the dew point temperature, substantially no liquid is present. This process is known as the "dry mode" process. One method to maximize the ability of heat removal is, throughout the operation, to reduce to the lowest possible value the temperature of the gaseous feed stream into the reactor.

The prior art suggests a number of methods for removing heat from gas fluidized bed polymerization processes. According to the "condensed mode" process a two phase mixture is directed into the fluidized bed as a fluidizing medium, the liquid portion of which vaporizes when it is exposed to the heat of the reactor. Fluid is formed by cooling the recycle stream below the dew point temperature, thereby converting a portion of the gas into a liquid, and the cooled recycle stream is introduced into the fluidized bed polymerization reactor. The objective is to take advantage of the cooling effect brought about by the vaporization, i.e., by bringing the temperature of the fluidized bed down to a point where degradation of the polymer and the catalyst are avoided and agglomeration of the polymer and chunking are prevented. The liquid phase is provided by a portion of the recycle gases, which includes monomers and low boiling liquid hydrocarbons, inert to the reaction conditions needed for polymerization, and condensation. Condensed mode fluidized bed reactor polymerization processes have been disclosed in for example U.S. Pat. Nos. 4,543,399 and 4,588,790 which describes introducing an inert liquid into the recycle stream to increase the dew point temperature of the recycle stream and allowing the process to operate at levels of up to 17.4% liquid by weight, based on the total weight of the cooled recycle stream. A condensed mode process is considered to be advantageous because its ability to remove greater quantities of heat generated by polymerization increases the polymer production capacity of a fluidized bed polymerization reactor. A commonly used liquid hydrocarbon is isopentane, which boils at about 27° C. C., and consequently becomes a vapor in the recycle line in view of the heat present in the recycle gases. The recycle gases leave the reactor, are cooled, and then condensed to the extent that a vapor phase and liquid phase are formed. The velocity of the recycled gas/liquid mixture should be sufficient to support the fluidized bed, but slow enough to avoid excessive entrainment of fines. The cooling capacity should be sufficient to improve the production rate in terms of space/time/yield.

U.S. Pat. No. 5,428,118 patent discloses an improved method for polymerizing one or more polyolefins in the presence of a transition metal catalyst in at least one gas phase reactor having an expanded section, the improvement comprising generating a tangential flow of gas or gas-solids in the expanded section of the gas phase reactor to reduce fines entrainment into the gas cycle system and to reduce or remove solid particle build-up on one or more interior surfaces of the expanded section of the reactor.

However, there is a continuous desire in the polyolefin production to increase the space time yield.

This is also the object of this invention.

This object is achieved by a process for the continuous preparation of a polyolefin in a reactor from one or more α-olefin monomers of which at least one is ethylene or propylene, wherein the reactor comprises a fluidized bed, an expanded section located at or near the top of the reactor, a distribution plate located at the lower part of the reactor and an inlet for a recycle stream located under the distribution plate wherein the process comprises
feeding a polymerization catalyst to the fluidized bed in the area above the distribution plate
feeding the one or more α-olefin monomers to the reactor
withdrawing the polyolefin from the reactor
circulating fluids from the top of the reactor to the bottom of the reactor, wherein the circulating fluids are compressed using a compressor and subsequently cooled using a heat exchanger to form a cooled recycle stream comprising liquid, and wherein the cooled recycle stream is introduced into the reactor using the inlet for the recycle stream
wherein a part of the cooled recycle stream is drawn to form a liquid comprising stream, wherein the liquid comprising stream is introduced into the expanded section during at least part of the polymerization process,
and wherein the liquid comprising stream is brought into contact with at least part of the interior surface of the expanded section.

By adding a stream comprising liquid as compared to a gas or gas-solid stream or as compared to not adding a stream comprising liquid to the expanded section, inventors have found that it is possible to dramatically increase the production rate.

Furthermore, the formation of fines and sheeting may also be reduced, thereby improving operability and continuity of the polyolefin polymerization process.

In addition, the polyolefin produced may show more uniformity due to the more uniform temperature in the expanded section.

With 'continuous polymerization of one or more α-olefins' or 'continuous preparation of polyolefin' is meant herein that one or more α-olefin monomers of which at least one is ethylene or propylene are fed to the reactor and polyolefin thus produced is (semi)-continuously withdrawn through a polymer discharge system connected to the reactor.

Other preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one or more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the system or process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

With a reactor is herein meant a vessel designed for reactions to take place therein, comprising inlets for receiving feed materials and outlets for discharging reaction products.

The reactor in the process of the invention comprises a fluidized bed, an expanded section located at or near the top of the reactor, a distribution plate located at the lower part of the reactor and an inlet for a recycle stream located under the distribution plate. The reactor is preferably closed off at the top and the bottom by a hemisphere.

With 'fluidized bed' as used herein is meant that particles (in this case preferably the catalyst and/or the catalyst to which one or more α-olefin monomers of which at least one is ethylene or propylene is attached, herein also referred to as prepolymerized catalyst, and the growing polymer particles) are held suspended by the fluid stream in which a particle/fluid mixture acts as a fluid. This can be achieved by placing the amount of particles under appropriate conditions, for instance by upwardly flowing fluid (gas and or gas/liquid mixture) through the solid particles at a velocity that exceeds the minimum fluidization velocity and enough to suspend the solid particles and causing them to behave as a fluid. The velocity should not be so high as to result in undue removal of polymer particles from the bed.

In order to maintain a fluidized bed in the process of the invention, the superficial gas velocity m may be in the range of 0.5 to 5 m/s. For example, may be at least 1, for example at least 1.5, for example at least 2 and/or for example at most 4.5, for example at most 4, for example at most 3.5, for example at most 3 m/s.

The expanded section located at or near the top of the reactor is not intended for gas-phase polymerization, but instead is suitable for gas expansion. It has the function to disengage the reaction mixture and the polymer product of the reaction. Accordingly, this section does not function as a reaction zone. The superficial gas velocity may be of such low value that polymer particles preferably do not enter into the expanded section for example to avoid clogging to occur in the compressor.

In such reactor, during the course of polymerization, fresh polymer particles are produced by catalytic polymerization of α-olefin monomers. Such polymer particles are projected upwards in the direction of the expanded section through the circulating gas. Most of these particles do preferably not reach the expanded section or return to the fluidized bed by gravity as the superficial gas velocity decreases in the expanded section.

The distribution plate may be any device that is suitable for distributing the cooled recycle stream in the reactor to keep a fluidized bed and to serve as a support for a quiescent bed of the polymerization catalyst and polyolefin when the reactor is not in operation. The distribution plate is used for achieving good gas distribution. For example, the distribution plate may be a screen, slotted plate, perforated plate, a plate of the bubble-cap type, or other conventional or commercially available plate or other fluid distribution device. An example of a commonly used type of distribution plate is a perforated plate with some above-hole structure on top of each hole, to prevent particle sifting.

The distribution plate is generally positioned perpendicular to the longitudinal axis of a reactor, wherein the fluidized bed is located above said distribution plate and a mixing chamber region below said distribution plate.

In addition to the distribution plate, the reactor may be further equipped with other means for agitation, such as mechanical agitation, for example a stirrer. Preferably, the reactor does not comprise mechanical agitation.

The person skilled in the art is aware of the type of inlets that may be suitable for allowing the recycle stream to enter into the reactor under the distribution plate.

Catalyst.

With 'catalyst' as used herein is meant to include both catalyst and cocatalyst, and any other compounds, which assist in catalyzing the production of the polyolefin as well as the prepolymerized catalyst (the catalyst to which one or more α-olefin monomers of which at least one is ethylene or propylene is attached).

The polymerization catalyst may be fed to the reactor for example by using feeding means, such as a pump. The polymerization catalyst may for example be fed as a suspension in a solvent, for example a hydrocarbon solvent or the like, or in an inert gas, such as nitrogen (dry catalyst). The polymerization catalyst may also be injected into the fluidized bed.

The polymerization catalyst may be fed at any position in the area above the distribution plate or at a combination of positions in the reactor.

The person skilled in the art is aware of which catalysts are suitable for continuous polymerization of monomers such as α-olefin monomers.

For example, heterogeneous polymerization catalysts, which are catalysts that are supported on an inert substrate, for example silica or alumina may be used. Suitable examples of heterogeneous catalysts include supported Ziegler Natta and supported metallocene catalysts and combinations thereof, for example in a mixed catalyst system. Examples of a catalyst composition for polymerization of α-olefins comprising at least two catalytic components are for example described in EP1764378A1, hereby incorporated by reference. EP1764378A1 discloses a catalyst composition comprising a metallocene component and a Ziegler-Natta type transition metal component, at least one activator and support material. Metallocene catalysts are for example described by Hamielec and Soares in "Polymerisation reaction engineering-metallocene catalysts" (Prog. Pol. Sci. Vol. 21, 651-706, 1996), hereby incorporated by reference. The polymerization catalyst may also be a metal oxide catalyst, for example a chromium oxide catalysts. Such metal oxide catalyst may for example be based on a support of an inert substrate, for example on silica, alumina silicate or alumina, for example on a highly porous support of silica, alumina silicate or alumina as for example disclosed in the "Handbook of Polyethylene" by Andrew Peacock at pages 61-62, hereby incorporated by reference.

The group of metallocene catalysts includes many variations. In the most general form, metallocene catalysts comprise a metal atom, for example titanium, zirconium or hafnium attached to for example four ligands, for example two substituted cyclopentadienyl ligands and two alkyl, halide or other ligands with an optionally modified organoalumoxane as activator, for example methylaluminoxane (MAO) or a compound based on boron. Examples of inert substrates that can be used as support for a metallocene catalyst include inorganic oxides, for example $SiO_2$, $MgCl_2$, $Al_2O_3$, $MgF_2$ and $CaF_2$. Preferably, the polymerization catalyst used in the system and process of the invention is a metallocene catalyst supported on silica, for example a silica as commercially available, for example Grace Davison 948 silica or Ineos ES 70 silica.

A Ziegler Natta catalyst may be used together with a cocatalyst in the system and process of the invention. Suitable example of cocatalysts include but are not limited to organo aluminium compounds having formula $AlR_3$, wherein R stands for a hydrocarbon having 1 to 10 C-atoms. Examples of organo aluminium compounds having formula $AlR_3$ include triethylaluminium alkyl, triisobutyl aluminium trialkyl, tri-n-hexyl aluminium and tri octyl aluminium.

Examples of inert substrates that can be used as support for a Ziegler Natta catalyst include inorganic oxides, for example oxides of silica, alumina, magnesium, titanium and/or zirconium; magnesium chloride, clays, zeolites, polystyrene, polyethylene, polypropylene, graphite and/or layered silicates.

It will be clear to the person skilled in the art that also mixtures of polymerization catalysts may be used in the invention.

The optimal amount of catalyst and ratios of procatalyst to cocatalyst and potential external donors can easily be determined by the person skilled in the art.

Ziegler-Natta catalyst systems and their components are suitable for preparing a polyolefin and are generally known. "Ziegler-Natta" (Z-N) refers to catalyst systems comprising a transition metal-containing solid catalyst compound (also typically referred to as a procatalyst); an organometallic compound (also typically referred to as a co-catalyst) and one or more electron donor compounds (e.g. external electron donors). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. Several examples of Ziegler-Natta catalyst are discussed below.

EP 1 273 595 of Borealis Technology discloses a catalyst obtained by reacting a complex of a Gp IIa metal, an electron donor, and a transition metal as an emulsion the dispersed phase of which contains more than 50 mol % of the Gp IIa metal in said complex.

EP 0 019 330 of Dow discloses a Ziegler-Natta type catalyst obtained by reacting a halogenated magnesium compound, a halide of tetravalent titanium in the presence of a halohydrocarbon, and a tetravalent titinanium compound.

The Examples of U.S. Pat. No. 5,093,415 of Dow discloses a catalyst obtained by reacting titanium tetrachloride, diisobutyl phthalate, and magnesium diethoxide, and then titanium tetrachloride and phthaloyl chloride and again titanium tetrachloride.

Example 2 of U.S. Pat. No. 6,825,146 of Dow discloses a catalyst obtained by reacting titanium tetrachloride, magnesium diethoxide, titanium tetraethoxide, and titanium tetrachloride, with ethylbenzoate, and again titanium tetrachloride, and benzoylchloride.

U.S. Pat. No. 4,771,024 of Dow discloses a catalyst obtained by reacting dried silica with carbonated magnesium solution, then titanium tetrachloride, chlorobenzene and ethylbenzoate, and $TiCl_4$ and chlorobenzene.

WO03/068828 of China Petroleum discloses a catalyst obtained by reacting magnesium chloride, toluene, epoxy chloropropane and tributyl phosphate, then phthalic anhydride and $TiCl_4$ and an internal donor, then again $TiCl_4$.

U.S. Pat. No. 4,866,022 of Amoco discloses a catalyst obtained by reacting a magnesium-containing species, a transition metal halide and an organosilane, again with transition metal compound and an electron donor.

For example, the Ziegler-Natta type procatalyst in the catalyst system according to the present invention is a magnesium-based supported catalyst obtained by the process as described in WO 2007/134851 A1, comprises the following phases: phase A): preparing a solid support for the procatalyst based on a Grignard compound and a silane compound; phase B): optionally activating said solid support obtained in phase A) using one or more activating compounds to obtain an activated solid support; phase C): contacting said solid support obtained in phase A) or said activated solid support in phase B) with a titanium catalytic species and optionally one or more internal donors and/or optionally an activator to obtain said procatalyst; optionally Phase D: modifying said intermediate product obtained in phase C) with a Group 13—or transition metal modifier and optionally one or more internal donors.

The one or more α-olefin monomers may be fed to the reactor (8) using feeding means such as a pump. The monomers are preferably fed to the reactor (8) by adding the monomers to the fluids that are circulated from the top of the reactor to the inlet for the recycle stream prior to cooling of the fluids. Preferably, the one or more α-olefin monomers are added in such amounts that they make up for the one or more α-olefin monomer consumed during the polymerization.

The one or more α-olefin monomers may be fed in one or in multiple feeding streams. For example, one type of olefin monomer, typically ethylene and/or propylene may be comprised in the feed (60) and another type of α-olefin monomer, also referred to herein as the comonomer, may be comprised in the feed (70).

Likewise, withdrawal of the polyolefin (30) may be done at any position in the area above the distribution plate or at a combination of positions.

Polyolefin (30) may be withdrawn from the multi-zone reactor (8) using any suitable means, for example a polymer discharge system. The polyolefin may be used as such or may be subjected to purification or other end-processing Fluids are circulated from the top of the reactor to the bottom of the reactor. The circulating fluids are cooled using a heat exchanger, resulting in a cooled recycle stream comprising liquid. The cooled recycle stream is introduced into the reactor using the inlet for the recycle stream.

For the avoidance of doubt the term 'fluids' encompasses liquids, gases and mixtures thereof, wherein the term 'liquids' includes liquids containing solid particles, such as slurries.

The fluids may be cooled to below the dew point of the fluids using any suitable cooling means. For example, cooling of the fluids may be performed using a cooling unit, for example a heat exchanger.

The dew point may be increased by increasing the operating pressure of the fluids and/or by increasing the percentage of condensable fluids and simultaneously decreasing the percentage of non-condensable gases in the fluids.

By feeding the fluids that are cooled to below the dew point of the fluids into the bottom inlet of the reactor, the fluids will be passed through the distribution plate (6) into the section above the distribution plate (6), resulting in the formation of a fluidized bed and/or a bubble column. Heat generated by the polymerization will cause the liquids in the fluids to evaporate. The feeding of the polymerization catalyst and the one or more α-olefin monomers to the reactor (8) will result in the formation of polyolefin (30), which is withdrawn from the reactor (8). The recycle stream is recirculated from the top of the reactor to the bottom inlet. The one or more α-olefin monomers and other fluids, such as hydrogen, an inert gas or liquid, for example a condensable inert component, may be added to the recycle stream to make up for the target composition (there is loss due to e.g. reaction, withdrawal and venting) before cooling the fluids to below the dew point of the fluids to form a cooled recycle stream.

Preferably in the processes of the invention, the fluids are cooled to such extent that the amount of liquid in the cooled recycle stream (10) is at least 7% by weight, for example at least 9%, for example at least 14% by weight based on the total amount of liquid and gas. For example, the amount of liquid in the cooled recycle stream is at least 14.5%, for example at least 20%, for example at least 25% and/or for example at most 95%, for example at most 90%, for example at most 90%, for example at most 85%, for example at most 80%, for example at most 75%, for example at most 70%, for example at most 65%, for example at most 60%, for example at most 55%, for example at most 55% by weight based on the total amount of liquid and gas in the cooled recycle stream. Preferably, the amount of liquid in the cooled recycle stream is at least 25% and for example at most 55% by weight based on the total amount of liquid and gas in said cooled recycle stream.

High amounts of liquid in the cooled recycle stream enables feeding of one or more very high activity catalyst system.

The compressor (400) may be any device that is suitable for compressing the feed (60) and the recycle stream (40) using the compressor (400) to form the compressed fluids (50). By compressing the feed (60) and the recycle stream (40), the pressure of the compressed fluids (50) is increased compared to the feed (60) and the recycle stream (40) before use of the compressor (400).

Introduction of the cooled recycle stream under the distribution plate may be done using any suitable means for introducing fluids, for example using injection nozzles.

In the process of the invention, a liquid comprising stream is introduced into the expanded section during at least part of the polymerization process, for example the liquid-containing stream is introduced into the expanded section during the entire polymerization process. The addition of a liquid comprising stream may be intermittent or continuous.

The liquid comprising stream may for example be added to the expanded section in a circumferential manner, for example by using at least one nozzle that is tangential to the interior wall of the expanded section and/or the liquid comprising stream may be added to the expanded section via a pipe ring with a plurality of nozzles directed to the interior surface of the expanded section.

In the process of the invention, the liquid comprising stream is brought into contact with at least part of the interior surface of the expanded section.

Preferably, in addition to the drawing of the liquid comprising stream, a gaseous stream is drawn from a point downstream of the compressor and upstream of the heat exchanger and mixed with part of the cooled recycle stream to form the liquid comprising stream.

This process, wherein a gaseous stream is mixed with the stream drawn from the cooled recycle stream is schematically represented in FIG. 3.

In a special embodiment, the liquid comprising stream is drawn from any point downstream of the heat exchanger and before the inlet for the recycle stream and a gaseous stream is drawn from a point downstream of the compressor and upstream of the heat exchanger, after which the gaseous stream and the liquid comprising stream are mixed to form a mixture of the gaseous stream and the liquid comprising stream and wherein the mixture of the gaseous stream and the liquid comprising stream is brought into contact with at least part of the interior surface of the expanded section.

In addition, an alkane containing stream comprising an inert alkane may be added to the a reaction system comprising the reactor and the cooled recycle stream, preferably to the liquid comprising stream in the process of the invention.

Some examples of places of addition of the alkane containing stream are shown with (a) in FIGS. 1, 2, 3 and 4. The alkane containing stream may be added alone or in combination with a thermal run away reducing agent as defined herein.

In a special embodiment of the process of the invention, an alkane containing stream comprising an inert alkane may be added to the liquid comprising stream.

Preferably, the inert alkane is chosen from the group consisting of alkanes having 3 to 6 carbon atoms, preferably from the group of i-butane, n-butane, propane, cyclopropane and mixtures thereof, more preferably chosen from the group consisting of i-butane.

Preferably, the alkane containing stream is chosen such that the molar composition of the alkane having 3 to 6 carbon atoms in the reactor is at least 1 mol %, preferably at least 2 mol %, more preferably at least 2.4 mol % and/or at most 10 mol %, preferably at most 5 mol %. Molar composition of the reactor as defined herein is measured by measuring the amount of components in moles in the recycle stream upstream of the compressor.

In a special embodiment of the process of the invention, a thermal run away reducing agent is added to the reaction system comprising the reactor and the cooled recycle stream. Preferably, the thermal run away reducing agent is added to the liquid comprising stream.

Some examples of places of addition of the thermal run away reducing agent are shown with (a) in FIGS. 1, 2, 3 and 4. The TRRA may be added alone or in combination with the alkane containing stream.

In the process of the invention, a stream comprising a thermal run away reducing agent (TRRA-containing stream) may be introduced into the reactor during at least part of the polymerization process. The TRRA may be introduced into several parts of the reaction system, for example the TRRA may be introduced into the expanded section and/or to the fluidized bed, for example during at least part of the polymerization process. For example one or more TRRA-containing streams may be introduced into the expanded section during the entire polymerization process. The addition of a TRRA-containing stream may be intermittent or continuous.

TRRA

With thermal run away reducing agent (TRRA) is meant a chemical that is capable of slowing down or even killing the polymerization reaction by slowing down or even killing the catalyst.

The thermal run away reducing agent (TRRA) may be chosen from the group consisting of esters, amines, nitriles, amides and mixtures thereof, preferably from the group of (aromatic) amides and aromatic carboxylic acid esters, more preferably the TRRA is chosen from the group of aromatic carboxylic acid esters, most preferably, the TRRA is p-ethoxy ethyl benzoate (PEEB).

Suitable esters include but are not limited to carboxylic acid esters, for example aliphatic carboxylic acid esters, for example ethyl acrylate, methyl methacrylate, di-methyl carbonate, ethyl cyclohexanoatem propyl pivalate; and aromatic carboxylic acid esters, for example ethyl benzoate, methylbenzoate, p-methoxy ethylbenzoate, p-ethoxy methylbenzoate, methylbenzoate, p-ethoxy ethylbenzoate, dimethyloxalate, p-chloroethylbenzoate, p-amino hexylbenzoate, isopropyl naphthanate, n-amyl toluate, Suitable amines include but are not limited to aminobenzoate, aliphatic amines, for example N,N,N'N'-tetramethyl ethylene diamine; cycloaliphatic amines, for example 1,2,4-trimethyl piperazine, 2,3,4,5-tetraethyl piperidine and phthalates, for example dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate.

Suitable nitriles include but are not limited to aromatic and aliphatic nitriles, for example alkane nitriles, for example trimethyl acetonitrile.

Suitable amides include but are not limited to aromatic and aliphatic amides, for example n, n-dimethyl benzamide, Preferably, the TRRA is chosen from the group of esters, for example an aromatic carboxylic acid ester, preferably the TRRA is p-ethoxy ethyl benzoate (PEEB); amides, for example n,n-dimethylbenzamide; or nitriles, for example trimethylacetonitrile.

In the process of the invention, the TRRA-containing stream may be brought into contact with at least part of the interior surface of the expanded section, preferably into contact with the interior wall of the external section.

Preferably, the TRRA-containing stream further comprises an alkane chosen from the group consisting of alkanes having 3 to 6 carbon atoms and mixtures thereof. For example, the alkane is chosen from the group consisting of i-butane, n-butane, propane and mixtures thereof, for example chosen from the group consisting of i-butane, for example liquid i-butane. The advantage of using an alkane chosen from the group consisting of alkanes having 3 to 6 carbon atoms and mixtures thereof in the TRRA-containing stream is that this may increase the production rate of the polyolefin.

Preferably, in the process of the invention, the TRRA-containing stream is added to the expanded section in a circumferential manner, for example by using at least one nozzle that is tangential to the interior wall of the expanded section. Alternatively, the TRRA-containing stream may be added to the expanded section in a circumferential manner using a duct.

In this way, the expanded section will act as a cyclone for the TRRA-containing stream. (See also FIG. 4, for an example of the path of the TRRA-containing stream within the expanded section).

Alternatively, the TRRA-containing stream may be added to the expanded section via a pipe ring with a plurality of nozzles directed to the interior surface of the expanded section.

The optimal concentration of TRRA can easily be determined by the person skilled in the art and may depend on the polymerization conditions and catalyst used and intended polymer. For example, the molar ratio of TRRA/Si (in the catalyst) may be at least 0.5, for example at least 1, for example at least 1.5, for example at least 2, for example at least 2.5, for example at least 3, for example at least 3.5 and/or for example at most 6, for example at most, 5.5, for example at most 5, for example at most 4.5.

In a special embodiment of the process of the invention, the TRRA is added to the liquid comprising stream. This is illustrated in FIG. 1.

Preferably, the thermal run away reducing agent (TRRA) is chosen from the group consisting of esters, amines, nitriles, amides and mixtures thereof, preferably from the group of (aromatic) amides and aromatic carboxylic acid esters, more preferably the TRRA is chosen from the group of aromatic carboxylic acid esters, most preferably, the TRRA is p-ethoxy ethyl benzoate (PEEB).

Preferably, the liquid comprising stream is added to the expanded section in a circumferential manner, for example by using at least one nozzle that is tangential to the interior wall of the expanded section.

Such addition in a circumferential manner is illustrated by FIG. 4.

In one embodiment of the process of the invention, the liquid comprising stream is added to the expanded section via a pipe ring with a plurality of nozzles directed to the interior surface of the expanded section.

Preferably, the alkane is added such that the molar composition of the alkane in the reactor is at least 1 mol %, preferably at least 2 mol %, more preferably at least 2.4 mol % and/or at most 10 mol %, preferably at most 5 mol %.

In a special embodiment, the reactor is a multi-zone reactor as described in patent applications WO2015/078816 and WO2015/078815, hereby incorporated by reference.

Multi-Zone Reactor

In a special embodiment, the reactor is a multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate, wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone.

In some embodiments, the reactor of the invention may thereby preferably comprise at least a part of said second zone and/or said third zone contains an inner wall, wherein at least part of the inner wall has a cylindrical shape. The inner wall of the reactor may be the inner envelope delimiting the reactor.

In the context of the present invention, a gradually increasing diameter may for example mean an increase of the diameter of the inner wall of the reactor in the vertical direction towards the top of the reactor. Said increase may be for example stepwise, constant, logarithmic or exponential. One example of such is a continuously opening cone.

In the context of the present invention, a continuously opening cone may for example mean a conically shaped part of the inner wall of the reactor comprising a first circular opening and a second circular opening connected via the inner wall of the reactor, in which the derivative of the diameter variation of the wall as measured in the vertical direction towards the top of the reactor may preferably have a constant and positive value.

In some embodiments of the invention, the zone, preferably for example the second zone, in the area directly above the distribution plate is either in the form of a gradually increasing inner diameter or a continuously opening cone. In the context hereof, directly above may mean for example that a zone in the form of a gradually increasing inner diameter or a continuously opening cone, wherein the diameter or the opening increases in the vertical direction towards the top of the multi-zone reactor is located relative to the distribution plate, so that accumulation of liquids on the surface of the distribution plate may preferably be prevented.

With 'multi-zone reactor suitable for the continuous polymerization of one or more α-olefin monomers of which at least one is ethylene or propylene' is meant a device capable of containing and controlling the polymerization of the one of more α-olefin monomers and which device can comprise a fluidized bed. The multi-zone reactor of the invention is preferably closed off at the top and the bottom by a hemisphere.

The first zone of the multi-zone reactor is separated from the second zone by a distribution plate, and is located below the second zone of the multi-zone reactor.

In the first zone, a separation and distribution of the gas and liquid may take place, which is the primary function of the first zone. The first zone may further comprise a flow deflector associated with the entry conduit for providing the bottom recycle stream to prevent the accumulation of solids and liquids in the first zone. Such flow deflector is for example described in (the figures of) U.S. Pat. No. 4,933,149, hereby incorporated by reference.

The second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor. This leads to a variation of the superficial gas velocity at least in a part of the second zone, since superficial gas velocity depends on the circular cross-sectional surface inside the reactor. This allows to reduce superficial gas velocity in the vertical direction towards the top of the multi-zone reactor, so that the average residence time of polymer particles in the second zone can be increased as a result.

The continuously opening cone or gradually increasing inner diameter of the second zone is preferably located in the lower part of the second zone, more preferably is located directly above the distribution plate.

The second zone may comprise (part of) the fluidized bed where gas phase or gas-liquid polymerization may take place. The second zone is suitable for gas-liquid polymerization (under turbulent fluidization conditions). Turbulent fluidization conditions are described in U.S. Pat. No. 6,391,985, hereby incorporated by reference.

In one embodiment of the invention, a gas-liquid polymerization is conducted in the second zone and a gas phase polymerization is conducted in the third zone.

The third zone of the multi-zone reactor is located above the second zone of the multi-zone reactor. The third zone contains an inner wall, wherein at least part of the inner wall of the third zone is either in the form of a gradually increasing inner diameter of a continuously opening cone, wherein the diameter or the opening increases in the vertical direction towards the top of the multi-zone reactor. This leads to a variation of the superficial gas velocity at least in a part of the third zone, since superficial gas velocity depends on the circular cross-sectional surface inside the reactor. This allows to reduce superficial gas velocity in the vertical direction towards the top of the multi-zone reactor, so that the average residence time of polymer particles in the second zone can be increased as a result.

By using the multi-zone reactor in the process of the invention, in the second zone (2) a gas-liquid polymerization may take place and in the third zone, a gas-phase polymerization may then occur. Therefore, the invention may provide a two-stage polymerization.

The top zone or fourth zone is the expanded section.

The third zone may comprise part of the fluidized bed. The third zone is suitable for gas-phase polymerization.

The third zone and the second zone can be distinguished when the multi-zone reactor is operated; however there is no sharp boundary between the second and third zone. Typically, when operating the multi-zone reactor, the second zone will comprise more liquid than the third zone and in the third zone, a gas-phase polymerization will take place.

In such multi-zone reactor, during the course of polymerization, fresh polymer particles are produced by catalytic polymerization of α-olefin monomers. Such polymer particles are projected upwards in the direction of the fourth zone through the circulating gas. Most of these particles do preferably not reach the fourth zone or return to the second or third zone by gravity as the superficial velocity decreases in the fourth zone. The fourth zone may be connected to the third zone or optional further zone(s).

The multi-zone reactor of the invention may comprise further zones, such as for example one, two or even optionally three further zones, that can for example be a fifth zone and optionally a sixth zone and optionally even a seventh zone. These zones may provide a further possibility for polymerization, wherein each further zone may be operated at different reaction conditions. These further zones can be located preferably between the third zone and the top zone.

With inner diameter is meant the diameter in a given horizontal plane perpendicular to the center line of the multi-zone reactor as measured from the inside of the inner wall of the multi-zone reactor.

For example, the maximum inner diameter of the fourth zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the third zone. For example, the maximum inner diameter of the fourth zone is from 5 to 30% larger than the maximum inner diameter of the third zone.

For example, the maximum inner diameter of the third zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the second zone. For example, the maximum inner diameter of the third zone is from 15 to 30% larger than the maximum inner diameter of the second zone.

For example, the maximum inner diameter of the second zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the first zone. For example, the maximum inner diameter of the second zone is from 15 to 30% larger than the maximum inner diameter of the first zone.

In one embodiment, the invention relates to the reactor of the invention, wherein at least the bottom part of the third zone comprises an inner wall in the form of a gradually increasing inner diameter or a continuously opening cone, wherein the diameter or the opening increases in the vertical direction towards the top of the multi-zone reactor. In this embodiment, the bottom part of the second zone and/or of the bottom part of the fourth zone may also comprise an inner wall in the form of a gradually increasing inner diameter or a continuously opening cone, wherein the diameter or the opening increases in the vertical direction towards the top of the multi-zone reactor.

In one embodiment, as illustrated in FIG. 3 representing the embodiment of addition of the TRRA of FIG. 1, the zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

Therefore, preferably, zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

Preferably, the cylindrical shape is the shape of a right circular cylinder.

Preferably, the angle (α) of the inner wall of the part of the second zone having the gradually increasing inner diameter or having the continuously opening cone, relative to the centre line (9) of the multi-zone reactor (8) is from 0.1 to 80 degrees, preferably from 1 to 60 degrees, more preferably from 1-45 degrees, most preferably around 27 degrees.

For example, said angle (α) is at least 5, for example at least 7, for example at least 10 degrees, for example at least 20 degrees and/or for example at most 60, for example at most 50, for example at most 40, for example at most 35 degrees, for example at most 30 degrees. For example, the angle (α) is in the range from 10 to 40 degrees.

Preferably, the invention uses a multi-zone reactor as described herein, wherein the angle (α) of the inner wall of the part of the third zone having the gradually increasing inner diameter or having the continuously opening cone, relative to the centre line (9) of the multi-zone reactor (8) is from 0.1 to 80 degrees, preferably from 1 to 60 degrees, more preferably from 1-45 degrees, most preferably around 27 degrees, for example from 1 to 40 degrees.

For example, said angle (α) is at least 5, for example at least 7, for example at least 10 degrees, for example at least 20 degrees and/or for example at most 60, for example at most 50, for example at most 40, for example at most 35 degrees, for example at most 30 degrees. For example, the angle (α) is in the range from 10 to 40 degrees.

It should be appreciated by the skilled person that due to the fact that the volume in the multi-zone reactor of the invention expands from the first zone to the second zone and from the second zone to the third zone and from the third zone to the fourth zone when operating the multi-zone reactor, the superficial gas velocities in these zones will decrease from the first to the second and from the second to the third zone and from the third zone to the fourth zone. For example, the superficial gas velocities in the multi-zone reactor of the invention, for example when used to produce polyethylene, for example LLDPE, may be in the range of from 0.7 to 3.5 m/s, which may then be reduced to 0.5 to 2 m/s in the third zone, after which the superficial gas velocity may be further reduced in the top zone (also referred to herein as the fourth zone or as the expanded section). For example, the superficial gas velocities in the zones of the multi-zone reactor of the invention, for example when used to produce polypropylene, for example homo polypropylene, may be in the range of from 0.3 to 3 m/s, for example in the range from 0.4 to 2 m/s.

The continuous polymerization of one or more α-olefin monomers will produce polyolefins in the form of particles, herein also referred to as 'polyolefin' (30). Examples of polyolefins which may thus produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene, such as propylene homopolymers and propylene copolymers, including random copolymers of propylene and ethylene or random copolymers of propylene and α-olefin monomer having from 4 to 8 carbon atoms, for example but-1-ene, pent-1-ene, hex-1-ene or 4-methylpent-1-ene and optionally ethylene, for example a random copolymer of propylene and at most 5 wt % ethylene, and block or multi-block copolymers of propylene and optionally a comonomer (such as ethylene and/or α-olefin monomer having from 4 to 8 carbon atoms) and ethylene propylene rubber (EPR).

Preferably, in the process of the invention, the polyolefin produced is polypropylene, for example a propylene homopolymer, a propylene copolymer or a heterophasic copolymer, that is a composition comprising a propylene homopolymer or a propylene copolymer and an ethylene propylene rubber.

In another aspect, the invention relates to a polyolefin, preferably propylene obtainable by the process of the invention Such polyolefin has the advantage of being a more homogeneous (uniform) product.

Some special embodiments of systems suitable for the process of the invention are schematically represented in FIGS. 1-4 without however being limited thereto. The system of FIG. 1 (FIG. 1) is only one of numerous possible schematic arrangements. Thus, for example, the sequence of the equipment items in the circulated gas line, particularly of the cooler and compressor can also be reversed or further equipment items can be integrated into the line. Further elements such as systems for metering-in the catalyst are not shown in FIG. 1, such elements are known to those skilled in the art and can be integrated into the reactor in a known manner.

BRIEF DESCRIPTION OF THE FIGURES

FIG. 1 illustrates a system suitable for the continuous preparation of a polyolefin in a reactor from one or more α-olefin monomers of which at least one is ethylene or propylene, comprising a reactor (8), a compressor (400), a heat exchanger (5), an expanded section (4) (which expanded section is located at or near the top of the reactor) wherein the reactor comprises a distribution plate (6) (which distribution plate is located at the lower part of the reactor) and an inlet for a cooled recycle stream (10) located under the distribution plate an inlet for providing the catalyst (20)

Figure 1:
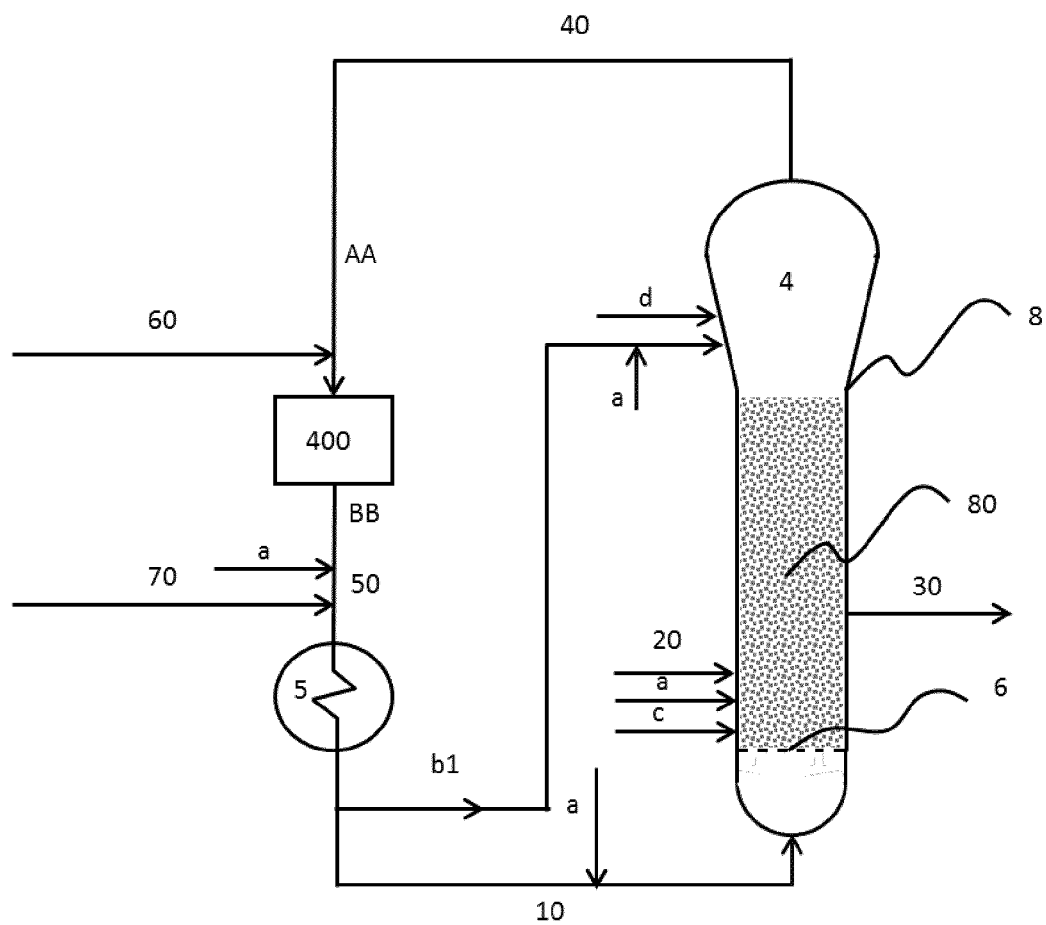
FIG. 1 illustrates a system suitable for the continuous preparation of a polyolefin according to the process of the invention.

an outlet for providing the polyolefin (30)

an outlet for a recycle stream (40), wherein the outlet for the recycle stream (40) of the expanded section is connected to an inlet of the compressor (400) via a first connection means (AA), for instance pipes wherein the compressor (400) comprises an outlet for compressed fluids (50), wherein the outlet of the compressor (400) is connected to an inlet for compressed fluids of the heat exchanger (5) via a second connection means (BB)

wherein optionally the second connection means (BB), for instance pipes, comprises an inlet for receiving a feed (70), wherein the heat exchanger (5) comprises an outlet for providing the cooled recycle stream (10) which outlet of the heat exchanger (5) is connected to the inlet of the reactor (8) for receiving the cooled recycle stream (10), wherein the first connection means (AA) may comprise an inlet for receiving a feed (60)

wherein the reactor further comprises a means for receiving the liquid comprising stream and for introducing it into the expanded section. (d) represents the optional TRRA. (a) represents the optional alkane containing stream and/or TRRA.

Figure 2:
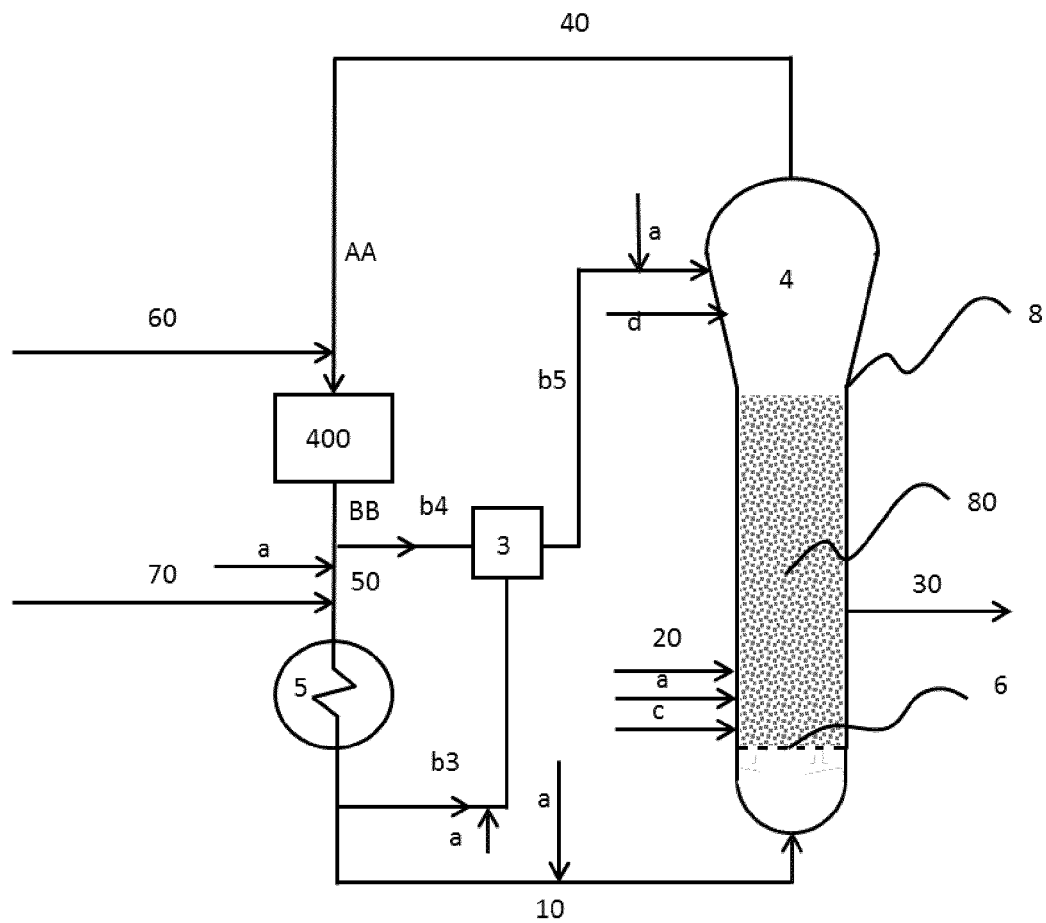
FIG. 2 illustrates a special embodiment of the system of FIG. 1.

FIG. 2 (FIG. 2) illustrates a preferred embodiment of the system of FIG. 1 and shows that a gaseous stream (b4) and the liquid-containing stream (b3) are connected to a mixing unit (3) which mixing unit is connected to the means for receiving the liquid comprising stream (b5) and wherein the system further comprises one or more inlets for receiving the alkane containing stream and/or TRRA (a).

Figure 3:
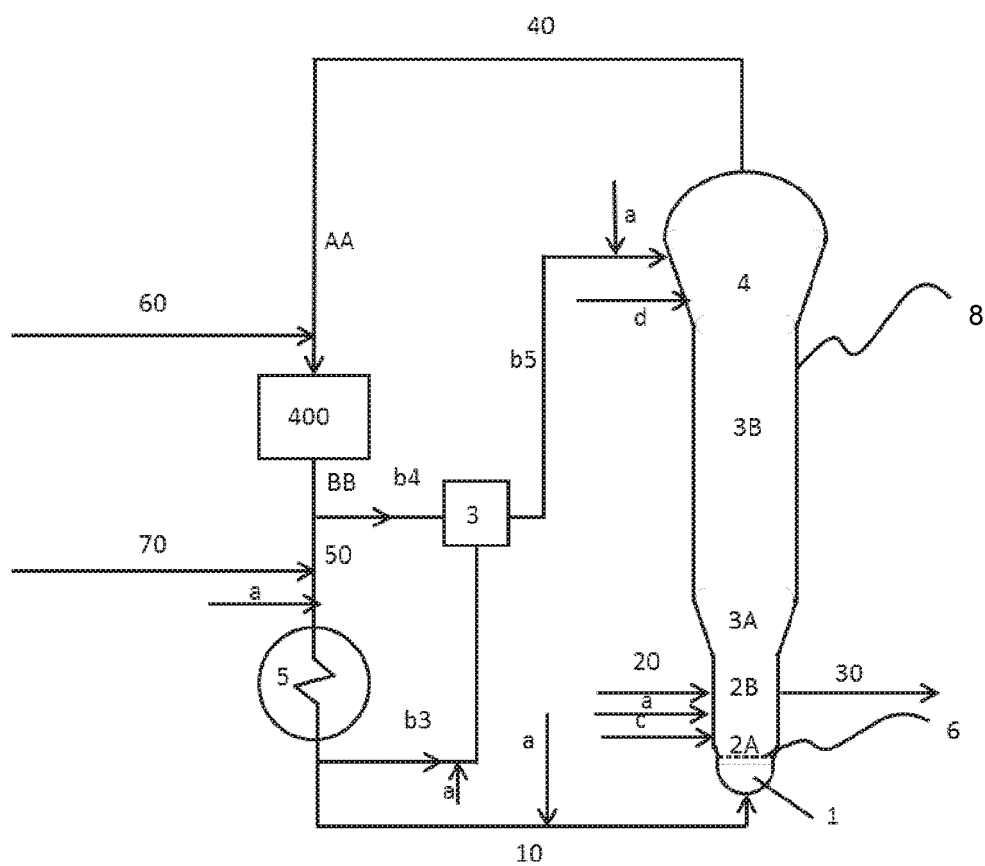
FIG. 3 illustrates a special embodiment of the system of FIG. 1, wherein the reactor is a multi-zone reactor.

FIG. 3 (FIG. 3) illustrates a special embodiment of the system of FIG. 3, wherein the reactor is a multi-zone reactor, which multi-zone reactor is suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate, wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone, wherein the zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

In FIG. 1 and FIG. 2, the fluidized bed (80) is indicated with dots.

Figure 4:
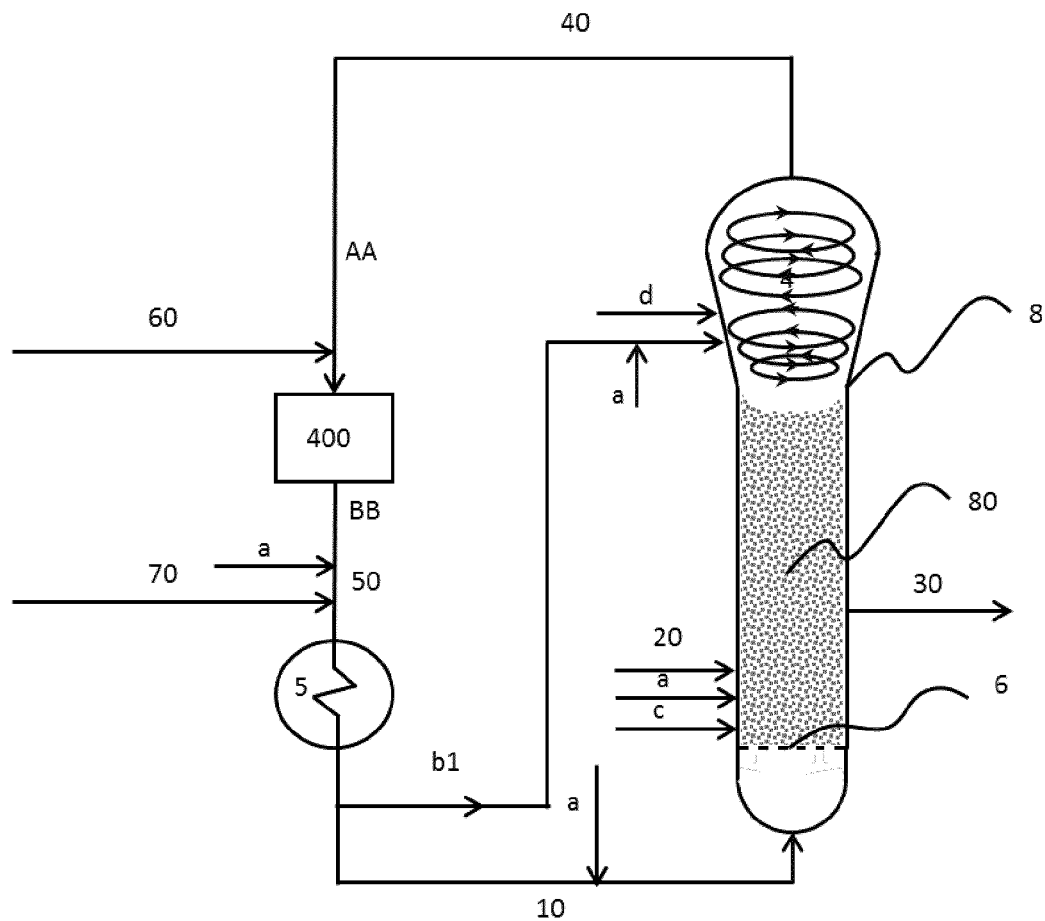
FIG. 4 illustrates a special embodiment of the flow of part of the cooled recycle stream in the expanded section of the reactor.

FIG. 4 (FIG. 4) illustrates the flow of the liquid-containing stream and of optional stream (d) in the expanded section, when this stream is added to the expanded section in a circumferential manner. In this figure, it is shown how the use of a nozzle that is tangential to the interior wall of the expanded section forces the (centrifugal/circumferential) movement of the liquid-containing stream and of optional stream (d) along the interior walls.

In another aspect, therefore, the invention relates to a reaction system for the continuous preparation of a polyolefin in a reactor from one or more α-olefin monomers of which at least one is ethylene or propylene, wherein the reaction system comprises a reactor (8), wherein the reactor comprises a fluidized bed (80), an expanded section (4) located at or near the top of the reactor, a distribution plate (6) located at the lower part of the reactor and an inlet for a recycle stream (10) located under the distribution plate wherein the system is arranged such that
a polymerization catalyst is fed to the fluidized bed in the area above the distribution plate
the one or more α-olefin monomers are fed to the reactor
the polyolefin is withdrawn from the reactor
fluids are circulated from the top of the reactor to the bottom of the reactor, wherein the circulating fluids are compressed using a compressor (400) and subsequently cooled using a heat exchanger (5) to form a cooled recycle stream comprising liquid, and wherein the cooled recycle stream is introduced into the reactor using the inlet for the recycle stream
and a part of the cooled recycle stream (b1) is drawn to form a liquid comprising stream, wherein the liquid comprising stream is introduced into the expanded section during at least part of the polymerization process,
and wherein the liquid comprising stream is brought into contact with at least part of the interior surface of the expanded section.

In the process and system of the invention, the one or more α-olefin monomers and other fluids, such as hydrogen, an inert gas or liquid, for example a condensable inert component, may be added to the recycle stream (40) to make up for reacted fluids before cooling the fluids to form the cooled recycle stream.

The feed (60) comprises a chain transfer agent, for example hydrogen and may further comprise gaseous α-olefin monomers and insert gaseous components, for example nitrogen. A chain transfer agent, such as hydrogen may for instance be used to adjust the molecular weight of the polyolefin (30) produced.

The feed (70) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neopentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

The condensable inert component is preferably selected from the group of isopentane, n-hexane, n-butane, i-butane and mixtures thereof. Because of their more attractive pricing, preferably isopentane and/or n-hexane are/is used as condensable inert component(s) in the feed (70)

When copolymers are produced, the process of the invention further comprises supplying a comonomer using feed (60) or (70) in case of a non-condensable comonomer and using feed (70) in case of a condensable comonomer.

It is apparent to the skilled person that the process of the present invention may also be applied when using multiple reactor. For example, for the purpose of the present invention, it is to be understood that if multiple reactors are employed, the liquid-containing stream may be added to the expanded section of any one of the reactors—and in case of two reactors, either reactor—and that the liquid-containing stream need not be added to all reactors of the multiple reactor train.

With 'condensed mode' is meant that a liquid comprising stream is used to cool the multi-zone reactor (8).

Hydrogen may for instance be used as a chain transfer agent to adjust the molecular weight of the polyolefin (30) produced.

It is apparent to the skilled person that recycle streams may be present in the reaction system of the invention, for example there may be a recycle stream that is vented back from a polymer discharge system to the fluid bed reactor aiming at an efficient discharge of the product while at the same time recycling a large portion of unreacted gasses back to the reactor.

In another aspect, the invention relates to a reaction system for the continuous preparation of a polyolefin in a reactor from one or more α-olefin monomers of which at least one is ethylene or propylene, wherein the reaction system comprises a reactor (8), wherein the reactor comprises a fluidized bed (80), an expanded section (4) located at or near the top of the reactor, a distribution plate (6) located at the lower part of the reactor and an inlet for a recycle stream (10) located under the distribution plate
wherein the system is arranged such that
a polymerization catalyst is fed to the fluidized bed in the area above the distribution plate
the one or more α-olefin monomers are fed to the reactor
the polyolefin is withdrawn from the reactor
fluids are circulated from the top of the reactor to the bottom of the reactor, wherein the circulating fluids are compressed using a compressor (400) and subsequently cooled using a heat exchanger (5) to form a cooled recycle stream comprising liquid, and wherein the cooled recycle stream is introduced into the reactor using the inlet for the recycle stream
and a part of the cooled recycle stream (b1) is drawn to form a liquid comprising stream, wherein the liquid comprising stream is introduced into the expanded section during at least part of the polymerization process,
and wherein the liquid comprising stream is brought into contact with at least part of the interior surface of the expanded section.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will now be elucidated by way of the following examples, without however being limited thereto.

EXAMPLES

The following examples show that controlling the catalyst activity in the expanded section (by addition of a thermal run away reducing agent) leads to a more homogenous product.

The inventors believe that the reason for obtaining a more homogeneous product is that the temperature is controlled in the expanded section due to the control of the catalyst activity.

This invention concerns the cooling of the expanded section (by way of taking part of the cooled recycle stream and adding this to the expanded section). This is expected to also control the temperature in the expanded section. Consequently, the inventors believe that by drawing a liquid comprising stream from part of the cooled recycle stream, introducing the liquid comprising stream into the expanded section during at least part of the polymerization process, and bringing the liquid comprising stream into contact with at least part of the interior surface of the expanded section will therefore also increase the homogeneity of the polyolefin obtained.

In addition, due to the contact of the liquid comprising stream with at least part of the interior surface of the expanded section, sheet formation in the expanded section will also be reduced as the liquid will physically wash the expanded section.

In a special embodiment of the invention, the temperature reducing effect in the expanded section of both the liquid comprising stream and the TRRA is combined by adding the TRRA to the reaction system.

The effect of the TRRA is demonstrated by the following examples;

These examples show that TRRAs, for example esters, amines, nitriles, amides and mixtures thereof, in particular paraethoxyethylbenzoate (PEEB), trimethylacetonitrile (TA) and n,n-dimethyl benzamide (DB) are capable of reducing the catalyst activity (and hence controlling the temperature in the expanded section) without however affecting the properties of the produced polyolefin.

Example 1. TRRA is PEEB

The polymerization catalyst was prepared as follows:

Example 1: Preparation of a Procatalyst on an Activated Butyl-Grignard Support

Preparation of Grignard Reagent (Step o))—Phase A

This step o) constitutes the first part of phase A of the process for preparation of the procatalyst.

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride with a concentration of 1.0 mol Mg/l was obtained.

Preparation of Solid Magnesium Compound (Step i))—Phase A

This step i) constitutes the second part of phase A of the process for preparation of the procatalyst.

This step is carried out as described in Example XX of EP 1 222 214 B1, except that the dosing temperature of the reactor is 35° C., the dosing time is 360 min and the propeller stirrer w is as used. An amount of 250 ml of dibutyl ether is introduced to a 1 liter reactor. The reactor is fitted by propeller stirrer and two baffles. The reactor is thermostated at 35° C.

The solution of reaction product of step A (360 ml, 0.468 mol Mg) and 180 ml of a solution of tetraethoxysilane (TES) in dibutyl ether (DBE), (55 ml of TES and 125 ml of DBE), are cooled to 10° C., and then are dosed simultaneously to a mixing device of 0.45 ml volume supplied with a stirrer and jacket. Dosing time is 360 min. Thereafter the premixed reaction product A and the TES-solution are introduced to a reactor. The mixing device (minimixer) is cooled to 10° C. by means of cold water circulating in the minimixer's jacket. The stirring speed in the minimixer is 1000 rpm. The stirring speed in reactor is 350 rpm at the beginning of dosing and is gradually increased up to 600 rpm at the end of dosing stage.

On the dosing completion the reaction mixture is heated up to 60° C. and kept at this temperature for 1 hour. Then the stirring is stopped and the solid substance is allowed to settle. The supernatant is removed by decanting. The solid substance is washed three times using 500 ml of heptane. As a result, a pale yellow solid substance, reaction product B (the solid first intermediate reaction product; the support), is obtained, suspended in 200 ml of heptane. The average particle size of support is 22 μm and span value $(d_{90}-d_{10})/d_{50}=0.5$.

Activation of First Intermediate Reaction Product (Step ii))—Phase B

This step ii) constitutes phase B of the process for preparation of the procatalyst as discussed above.

Support activation was carried out as described in Example IV of WO/2007/134851 to obtain the second intermediate reaction product.

In inert nitrogen atmosphere at 20° C. a 250 ml glass flask equipped with a mechanical agitator is filled with slurry of 5 g of reaction product B dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour.

The slurry was slowly allowed to warm up to 30° C. for 90 min and kept at that temperature for another 2 hours. Finally the supernatant liquid is decanted from the solid reaction product (the second intermediate reaction product; activated support) which was washed once with 90 ml of heptane at 30° C.

The activated support, according to chemical analysis, comprises a magnesium content of 17.3 wt. %, a titanium content of 2.85 wt. %, and a chloride content of 27.1 wt. % corresponding to a molar ratio of Cl/Mg of 1.07 and Ti/Mg of 0.084.

C. Preparation of the Procatalyst

A reactor was brought under nitrogen and 125 ml of titanium tetrachloride was added to it. The reactor was heated to 90° C. and a suspension, containing about 5.5 g of the support obtained in step C in 15 ml of heptane, was added to it under stirring. The reaction mixture was kept at 90° C. for 10 min. Then ethyl benzoate was added (EB/Mg=0.15 molar ratio). The reaction mixture was kept for 60 min. Then the stirring was stopped and the solid substance was allowed to settle. The supernatant was removed by decanting, after which the solid product was washed with chlorobenzene (125 ml) at 90° C. for 20 min. The washing solution was removed by decanting, after which a mixture of titanium tetrachloride (62.5 ml) and chlorobenzene (62.5 ml) was added. The reaction mixture was kept at 90° C. for 30 min. After which the stirring was stopped and the solid substance was allowed to settle. The supernatant was removed by decanting, after which a mixture of titanium tetrachloride (62.5 ml) and chlorobenzene (62.5 ml) was added. Then di-n-butyl phthalate (DBP) (DBP/Mg=0.15 molar ratio) in 3 ml of chlorobenzene was added to reactor and the temperature of reaction mixture was increased to 115° C. The reaction mixture was kept at 115° C. for 30 min. After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting and the solid was washed five times using 150 ml of heptane at 600° C., after which the procatalyst III, suspended in heptane, was obtained.

The Polymerization was Conducted as Follows:

Propylene polymerization experiments (Table 1) were performed using procatalysts I, II and III described above. Triethylaluminium (TEAL) was used as co-catalyst, and cyclohexylmethyldimethoxysilane (C-donor) or n-propyltrimethoxysilane (N-donor) was used as external donor (Si). Experiments were performed at different H2/C3 molar ratios.

The polymerization of propylene was carried out in a stainless steel gas phase reactor with a volume of 1800 mL. Under a nitrogen atmosphere, the co-catalyst (TEAL) and procatalyst synthesized according to the procedure described above and the external electron donor were dosed to the reactor as heptane solutions or slurries. 10-15 mg (2% wt Ti) of procatalyst were employed. The molar ratio of co-catalyst TEAL to titanium (from the procatalyst) was set to 130, and the Si/Ti ratio was set to 8. During this dosing, the reactor temperature was maintained below 30° C. Subsequently, the reactor was pressurized using a set ratio of propylene and hydrogen, and the temperature and pressure were raised to its setpoint (67 or 82° C. and 20 barg). After the pressure setpoint has been reached, the polymerization was continued for 60 minutes. During the polymerization reaction the gas cap composition of propylene and hydrogen was controlled using mass flow meters and online-GC control. After reaching the polymerization time the reactor was depressurized and cooled to ambient conditions. The propylene polymer so obtained was removed from the reactor and stored in aluminium bags.

The polymerization conditions are summarized in Table 1 below. In these experiments paraethoxyethylbenzoate (PEEB) was used as TRRA. The temperature of 67° C. reflects the temperature of a polymerization within the fluidized bed; the temperature of 82° C. reflects the temperature within the expanded section.

TABLE 1

| Experimental polymerization conditions. | | |
|---|---|---|
| Parameter | At T = 67° C. | At T = 82° C. |
| PC3 (barg) | 26 | 28 |
| H2 (mol %) | 0.37 | 0.37 |
| TEAL/Ti (mol/mol) | 130 | 130 |
| Si/Ti (mol/mol) | 8 | 8 |
| PC3 pressure of propylene | | |
| H2 hydrogen | | |
| TEAL tri-ethylaluminium | | |

The effect of different TRRA/Si ratios on the yield is shown in Table 2 below:

TABLE 2 yield versus TRRA/Si molar ratio at 67 and 82° C.

| Molar ratio TRRA/Si | Yield at 67° C. (Kg-PP/g-Cat) | Yield at 82° C. (Kg-PP/g-Cat) |
|---|---|---|
| TRRA/Si = 0 | 24.2 | 20.0 |
| TRRA/Si = 0.68 | 21.6 | 16.8 |
| TRRA/Si = 0.98 | — | 17.2 |
| TRRA/Si = 1.12 | — | 15.4 |
| TRRA/Si = 1.25 | — | 12.8 |
| TRRA/Si = 2 | — | 12.5 |
| TRRA/Si = 4 | 17.9 | 5.9 |
| TRRA/Si = 4.5 | 19.9 | 7.6 |

The polypropylene produced with TRRA/Si ratio 0; 4 and 4.5 and polymerization temperatures of 67° C. or 82° C. was characterized in terms of its molecular weight distribution (MWD) and crystallinity.

Crystallinity was determined using analytical temperature rising elution fractionation (ATREF) analysis was conducted according to the method described in U.S. Pat. No. 4,798, 081 and Wilde, L.; Ryle, T. R.; Knobeloch, D. C; Peat, L R.; Determination of Branching Distributions in Polyethylene and Ethylene Copolymers, J. Polym. ScL, 20, 441-455 (1982), which are incorporated by reference herein in their entirety. The composition to be analyzed was dissolved in 1,2-dichlorobenzene as solvent of analytical quality filtrated via 0.2 µm filter and allowed to crystallize in a column containing an inert support (Column filled with 150 µm stainless steel beans (volume 2500 µL) by slowly reducing the temperature to 20° C. at a cooling rate of 0.1° C./min. 1 g/L Irgafos and BHT were used as stabilizers The column was equipped with an infrared detector. An ATREF chromatogram curve was then generated by eluting the crystallized polymer sample from the column by slowly increasing the temperature of the eluting solvent (1,2-dichlorobenzene) from 20 to 130° C. ata rate of 1° C./min.

The instrument used was Polymer Char Crystaf-TREF 300.

Stabilizers: 1 g/L Topanol+1 g/L Irgafos 168
Sample: approx. 70 mg in 20 mL
Sample volume: 0.3 mL
Pump flow: 0.50 mL/min The software from the Polymer Char Crystaf-TREF-300 was used to generate the spectra.

molecular weight distribution was determined using IAV Molecular Characterization method. The chromatography equipment used is Polymer Laboratories PL-GPC220 with Viscotek 220R viscometer and Refractive index detector. The column set consists of three columns of Polymer Laboratories 13 µm PLgel Olexis, 300×7.5 mm. Standard linear polyethylene was used for calibration and reference.

Figure 5:
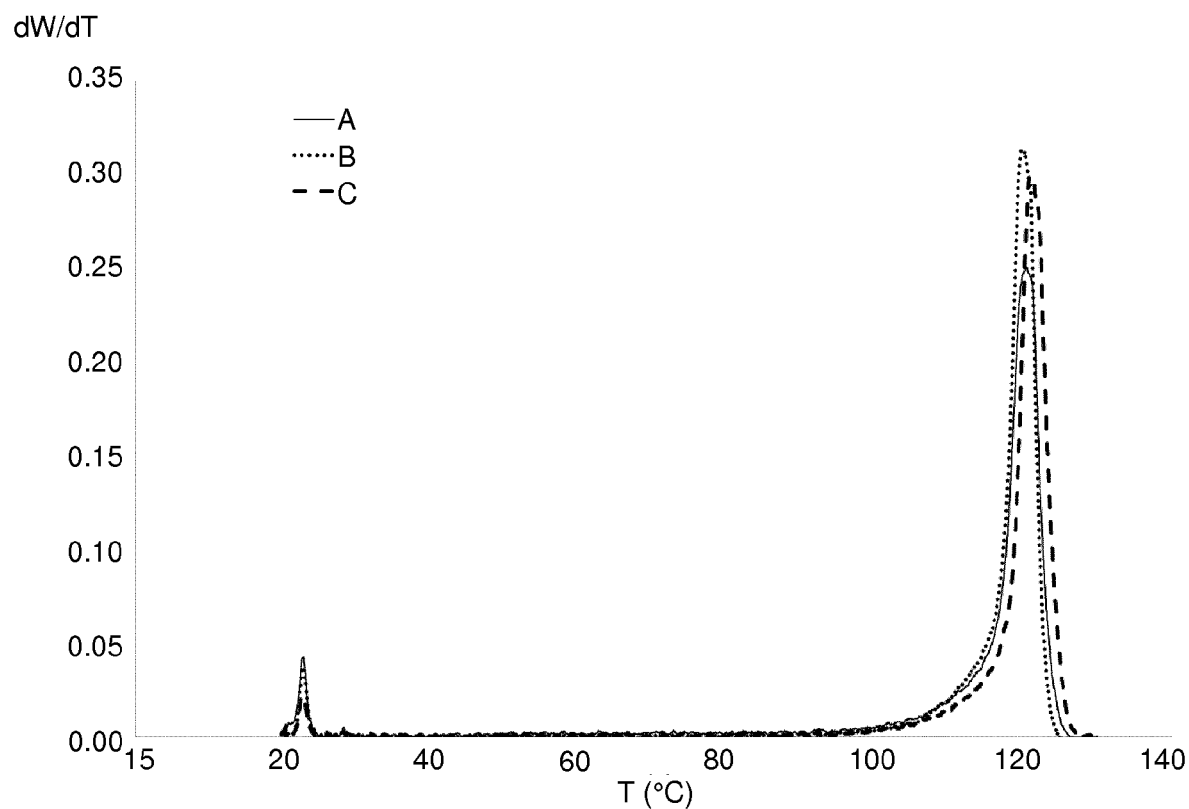
FIG. 5 is a TREF profile of the polymer produced in example 1.

The results of the aTREF analysis are represented in FIG. 5.

Profile A in FIG. 5 shows the aTREF temperature profile of a polypropylene produced without a TRRA at T=67° C.

Profile B in FIG. 5 also shows the aTREF temperature profile of a polypropylene produced without a TRRA at T=82° C.

Profile C in FIG. 5 shows the aTREF temperature profile of a polypropylene produced with TRRA/Si ratio of 4 at T=67° C.

As can be seen in FIG. 5 the addition of a TRRA does not significantly affect the crystallinity of the polymer produced at normal operating temperature (67° C.).

The crystallinity of these polypropylenes shows an almost similar peak temperature with a slight shift of the polymer sample produced at 82° C. towards lower crystallinity.

The results of the molecular weight distribution is given in Table 3 below:

TABLE 3

Summary of the molecular weight averages and their corresponding viscosities.

| Run | TRRA/Si (mol/mol) | Polymerization temperature (° C.) | Mn ($\times 10^3$ g/mol) | Mw ($\times 10^3$ g/mol) | Mz ($\times 10^3$ g/mol) | Mw/Mn | Mz/Mw | [η] (dL/g) |
|---|---|---|---|---|---|---|---|---|
| 1 | 0 | 67 | 69 | 460 | 1500 | 6.7 | 3.2 | 2.10 |
| 2 | 0 | 82 | 68 | 340 | 1000 | 5.1 | 2.9 | 1.73 |
| 3 | 4 | 67 | 89 | 550 | 1700 | 6.2 | 3.1 | 2.42 |
| 4 | 4 | 82 | 82 | 460 | 1600 | 5.7 | 3.5 | 2.12 |
| 5 | 4.5 | 82 | 90 | 470 | 1300 | 5.2 | 2.8 | 2.17 |
| 6 | 4.5 | 67 | 95 | 560 | 1700 | 6.0 | 3.1 | 2.46 |

The results of Table 3 show that a molecular weight distribution (Mw/Mn, MWD) closer to the desired MWD (run #1, MWD=6.7) is obtained when using a TRRA/Si in a preferred ratio of 4 mol/mol (runs #3 and 4) as compared to not using a TRRA at 82° C. (run #2). Moreover, since the activity of the catalyst is more reduced by the TRRA at a higher temperature, the contribution of the MWD of the polymer produced at 82° C. is less, thereby making an overall product that has a MWD closer to the desired MWD of 6.7 (combination of a bit of 5.7 of run #4 and 6.2 of run #2) than in the situation where a TRRA is not used; in the latter case the contribution of the MWD of 5.1 at 82° C. is more pronounced.

Example 2

With C-donor is meant: cyclohexylmethyldimethoxysilane.

With N-donor is meant: n-propyltrimethoxysilane

The polymerization catalyst was prepared as described in Example-1. Similar procedures and equipment used in Example-1 were used in this example for the molecular weight distribution (MWD) using GPC and crystallinity using ATREF.

The effect of different TRRA/Si ratios for both TA and DB on the yield are shown in Table 4 below:

TABLE 4

Yield versus TRRA/Si molar ratio for TA and DB at 67 and 82° C.

| TRRA | TRRA/Si (mol/mol) | Polymerization Temp. (° C.) | Yield (g-PP/mg-Cat · hr) |
|---|---|---|---|
| TA | 0 | 67 | 22.6 |
| TA | 7 | 67 | 12.8 |
| TA | 7 | 82 | 7.47 |
| DB | 0 | 67 | 20.8 |
| DB | 4 | 67 | 17.6 |
| DB | 4 | 82 | 8.67 |

Table 4 shows the yield with different molar ratio of TRRA to electron donor (TRRA/Si) for TA. The addition of TA shows almost similar deactivation degree at both temperatures where the drop in activity was −43% and −67% at 67 and 82° C., respectively, when bench marked with zero TA at 67° C. Therefore, TA is preferably used as one of the components in a mixture with another TRRA. Table 4 also shows the yield with different molar ratio of TRRA to electron donor (TRRA/Si) for DB. The TRRA/Si ratio of 4 is for DB, a ratio that satisfies the functionality of reducing catalyst activity by around 60% at elevated temperature, 82° C.; and maintaining the catalyst activity to be not lower than 15% at normal polymerization temperature, 67° C.

Figure 6:
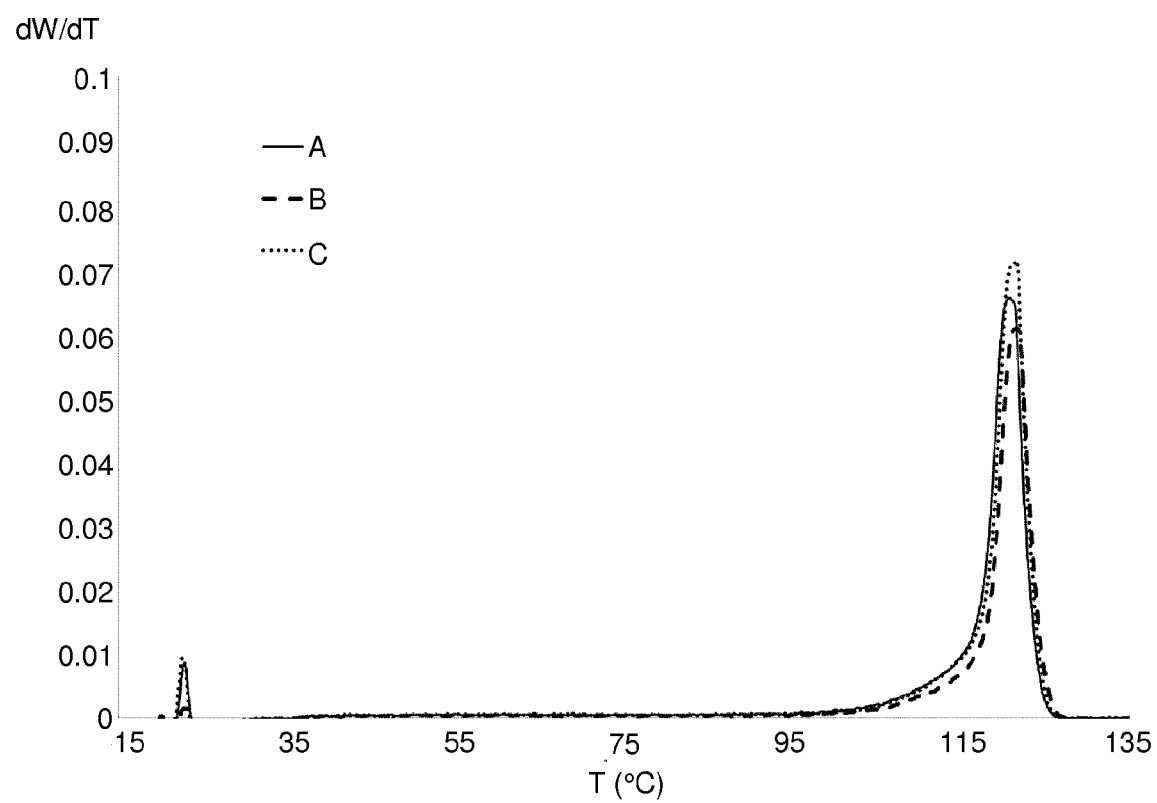
FIG. 6 is a TREF profile of the polymer produced in example 2.

A in FIG. 6 is the TREF of a polymer produced without TRRA at 67° C. B in FIG. 6 is the TREF of a polymer produced using TA as TRRA with a TRRA/Si molar ratio of 7 at a production temperature of 67° C. C in FIG. 6 is the TREF of a polymer produced using TA as TRRA with a TRRA/Si molar ratio of 4 at a production temperature of 82° C.

As can be seen from FIG. 6, the crystallinity of the polymer remains similar with or without using a TRRA (as exemplified by the use of TA).

Table 5 summarizes molecular weight averages and their corresponding viscosities.

TABLE 1

Yield versus TRRA/Si molar ratio for PEEB with different Si at 67° C.

| Si | TRRA/Si (mol/mol) | Yield @ 67° C. (kg-PP/g-cat) |
|---|---|---|
| C-donor | 0 | 24.2 |
| C-donor | 4 | 17.9 |
| N-donor | 0 | 14.5 |
| N-donor | 4 | 8.1 |

In order to visualize the effect of the type of external donor used (Si), the PEEB as TRRA was tested when Si is N-donor (n-propyltrimethoxysilane) and C-donor. Table 1 shows that the TRRA, represented here by PEEB, functioning in similar pattern when the Si changed from C-donor to N-donor. The productivity drop when TRRA added at similar TRRA/Si ratio is the same with C and N-donors at both polymerization temperatures regardless of the effect of Si type on catalyst productivity. Therefore, this example shows that regardless of the type of external donor used, the TRRA is effective in reducing catalyst productivity.

A TREF was performed on the polypropylene produced using N-donor and a PEEB/Si ratio of 4 and compared to the TREF of a polypropylene produced using the same C-donor but without using a TRRA. Also, in the case of N-donor and PEEB, it was seen that the crystallinity of the polymer remains similar with or without using a TRRA.

Conclusion

A TRRA is capable of reducing the catalyst activity at a temperature of 82° C. (which is the maximum desired temperature inside the expanded zone in a commercial polypropylene plant) or higher while maintaining very good overall catalyst activity at a normal polymerization temperature of e.g. in the range of 65 to 72° C. (representing the temperature of a fluidized bed in a commercial polypropylene plant). This allows a better control of the temperature in the expanded zone and consequently the production process will be more stable.

Therefore, the process of the invention, wherein a stream comprising a thermal run away reducing agent (TRRA-containing stream) is introduced into the expanded section

TABLE 5

Molecular structure parameters obtained from SEC-IR using convention calibration.

| Si | TRRA | TRRA/Si | Pol. Temp. (° C.) | $M_n$ (×10³) g/mol | $M_w$ (×10³) g/mol | $M_z$ (×10³) g/mol | $M_w/M_n$ | $M_z/M_w$ | [η] (dL/g) |
|---|---|---|---|---|---|---|---|---|---|
| C | | 0 | 82 | 68 | 340 | 1000 | 5.1 | 2.9 | 1.73 |
| C | | 0 | 67 | 85 | 450 | 1300 | 5.4 | 2.8 | 2.12 |
| C | TA | 7 | 82 | 81 | 370 | 940 | 4.6 | 2.5 | 1.85 |
| C | TA | 7 | 67 | 80 | 460 | 1300 | 5.7 | 2.8 | 2.14 |
| C | DB | 4 | 67 | 84 | 480 | 1400 | 5.7 | 3.0 | 2.19 |
| N | | 0 | 67 | 72 | 400 | 1100 | 5.5 | 2.8 | 1.91 |
| N | PEEB | 4 | 67 | 87 | 510 | 1500 | 5.9 | 3.0 | 2.30 |

Table 5 shows that the use of a TRRA does not significantly affect the polymer properties. It also shows that the functionality of the TRRA is not dependent on the type of external donor used.

Table 6 shows the yield of the polymer versus the TRRA/Si molar ratio for PEEB with different silane donors at 67° C.

during at least part of the polymerization process will provide a more uniform temperature profile across the fluidized bed, leading to a stable process, which in addition will lead to the production of more uniform polyolefins.

In addition, by bringing the TRRA-containing stream is brought into contact with at least part of the interior surface of the expanded section, fouling/sheeting will be significantly decreased if not eliminated.

In a special embodiment of the invention, the composition of the recycle stream (from which part is drawn to form the liquid comprising stream which cools the expanded section) is improved by the addition of an inert alkane.

As can be seen from the below examples, the use of an insert alkane, preferably n-butane or i-butane, more preferably i-butane has a positive effect on the production rate.

Example 3

A computer-based mathematical model capable of generating mass and heat balances along a fluidized bed reactor was used to run simulation in condensed mode operation to show the advantage of adding an alkane having 3 to 6 carbon atoms in the process of the invention. Firstly, the model was run using actual data from commercial polypropylene production to validate the model. The results are shown in Table 7.

TABLE 7

Commercial data validated versus the computer-based mathematical model

| Reactor Conditions | Example Number | |
|---|---|---|
| | a (Commercial) | b (Model Results) |
| Internal Reactor diameter (m) | 4.8 | 4.8 |
| Recycle Gas Superficial Velocity (m/s) | 0.3081 | 0.3081 |
| Recycle Gas Composition (mole fraction): | | |
| Propylene | 0.83893 | 0.83893 |
| Propane | 0.09398 | 0.09398 |
| Hydrogen | 0.00267 | 0.00267 |
| Nitrogen | 0.06443 | 0.06443 |
| n-Butane | — | — |
| Iso-Butane | — | — |
| Recycle Gas Density (kg/m$^3$.) | 67.25 | 72.31 |
| Reactor Temperature (° C.) | 68.08 | 68.08 |
| Reactor Inlet Temperature (° C.) | 65.70 | 65.70 |
| Reactor Pressure (kPag) | 3214.85 | 3214.85 |
| Reactor inlet Pressure (kPag) | 3334.53 | 3334.53 |
| Inlet Dew Point Temperature (° C.) | 67.19 | 68.56 |

TABLE 7-continued

Commercial data validated versus the computer-based mathematical model

| Reactor Conditions | Example Number | |
|---|---|---|
| | a (Commercial) | b (Model Results) |
| Condensed Liquid in Recycle Stream (% weight) | 39.78 | 36.94 |
| Production Rate (ton/h) | 50.6 | 51.2 |

As can be seen from Table 4, the actual data and the data from the model are very well comparable.

Subsequently, the model was ran representing commercial data when an alkane having 3 to 6 carbon atoms was not added (propane present in the recycle stream is produced by hydrogenation of propylene in the reactor in case hydrogen is present and/or comes from the feed-stream comprising propylene) versus when different amounts of n-butane, isobutane or cyclopropane were added to the recycle stream. The n-butane, i-butane or cyclopropane were added using feed (70)

The results are shown in Table 8 below. Table 8 shows the effect of a molar composition in the reactor of 0% additional alkane having 3 to 6 carbon atoms versus 2.0 mole % n-butane (I), 2.3 mole % n-butane (II), 2.65 mol % i-butane (III) and 2.75 mole % i-butane (IV) and 3.89 mole % cyclopropane (V).

As can be seen from Table 8, the feeding of an alkane having 3-6 carbon atoms increases the production rate from 51.2 tons/hour to for 2.0 mol % n-butane to 52.9 tons/hour, for 2.3 mol % n-butane to 54.9 tons/hour; for 2.65 mol % i-butane to 69.4 tons/hour, for 2.75 mole % i-butane to 71 tons/hour and for 3.89 mol % cyclopropane to 73.1 tons/hour.

Therefore, it has been shown that in the process of the invention, it is advantageous to add an alkane having 3-6 carbon atoms, preferably an alkane having 3 to 6 carbon atoms chosen from the group consisting of i-butane, n-butane, propane and mixtures thereof, more preferably chosen from the group consisting of i-butane, more preferably liquid i-butane is added to the reactor such that the molar composition of the alkane having 3 to 6 carbon atoms in the reactor is at least 1 mol %, preferably at least 2 mol %, more preferably at least 2.4 mol % and/or at most 10 mol %, preferably at most 5 mol %.

TABLE 8

| Reactor Conditions | b | I | II | III | IV | V |
|---|---|---|---|---|---|---|
| n-butane (mol %) | — | 2.0 | 2.3 | | | |
| i-butane (mol %) | — | — | — | 2.65 | 2.75 | |
| cyclopropane (mol %) | | | | | | 3.89 |
| Internal Reactor diameter (m) | 4.8 | 4.8 | 4.8 | 4.8 | 4.8 | 4.8 |
| Recycle Gas Superficial Velocity (m/s) | 0.3081 | 0.3081 | 0.3081 | 0.3081 | 0.3081 | 0.3081 |
| Recycle Gas Composition (mole fraction): | | | | | | |
| Propylene | 0.83893 | 0.80893 | 0.80593 | 0.80593 | 0.80593 | 0.80000 |
| Propane | 0.09398 | 0.09398 | 0.09398 | 0.09398 | 0.09398 | 0.09398 |
| Hydrogen | 0.00267 | 0.00267 | 0.00267 | 0.00267 | 0.00267 | 0.00267 |
| Nitrogen | 0.06443 | 0.07443 | 0.07443 | 0.07093 | 0.06993 | 0.06443 |
| n-Butane | — | 0.02000 | 0.02300 | — | — | — |
| Iso-Butane | — | — | — | 0.0265 | 0.0275 | — |
| cyclopropane | — | — | — | — | — | 0.03893 |
| Recycle Gas Density (kg/m$^3$.) | 72.31 | 72.17 | 72.41 | 73.12 | 73.38 | 73.17 |

TABLE 8-continued

| Reactor Conditions | b | I | II | III | IV | V |
|---|---|---|---|---|---|---|
| Reactor Temperature (° C.) | 68.08 | 68.08 | 68.08 | 68.08 | 68.08 | 68.08 |
| Reactor Inlet Temperature (° C.) | 0.03893 | 0.03893 | 0.03893 | 0.03893 | 0.03893 | 65.70 |
| Reactor Pressure (kPag) | 3214.85 | 3214.85 | 3214.85 | 3214.85 | 3214.85 | 3214.85 |
| Reactor inlet Pressure (kPag) | 3334.53 | 3334.53 | 3334.53 | 3334.53 | 3334.53 | 3334.53 |
| Inlet Dew Point Temperature (° C.) | 68.56 | 69.44 | 69.73 | 71.03 | 71.03 | 70.69 |
| Condensed Liquid in Recycle Stream (% weight) | 36.94 | 38.6 | 40.18 | 51.10 | 52.25 | 53.40 |
| Production Rate (ton/h) | 51.2 | 52.9 | 54.9 | 69.4 | 71.0 | 73.1 |

The invention claimed is:

1. A process for the continuous preparation of a polyolefin in a reactor from one or more α-olefin monomers of which at least one is ethylene or propylene,
wherein the reactor comprises a fluidized bed, an expanded section located at or near the top of the reactor, a distribution plate located at the lower part of the reactor and an inlet for a recycle stream located under the distribution plate;
wherein the process comprises
feeding a polymerization catalyst to the fluidized bed in the area above the distribution plate
feeding the one or more α-olefin monomers to the reactor
withdrawing the polyolefin from the reactor
circulating fluids from the top of the reactor to the bottom of the reactor, wherein the circulating fluids are compressed using a compressor and subsequently cooled using a heat exchanger to form a cooled recycle stream comprising liquid, and wherein the cooled recycle stream is introduced into the reactor using the inlet for the recycle stream
wherein a part of the cooled recycle stream is drawn to form a liquid comprising stream, wherein the liquid comprising stream is introduced into the expanded section during at least part of the polymerization process,
and wherein the liquid comprising stream is brought into contact with at least part of the interior surface of the expanded section.

2. The process according to claim 1, wherein a gaseous stream is drawn from a point downstream of the compressor and upstream of the heat exchanger and mixed with part of the cooled recycle stream to form the liquid comprising stream.

3. The process according to claim 1, wherein an alkane containing stream comprising an inert alkane is added to a reaction system comprising the reactor and the cooled recycle stream.

4. The process according to claim 1, wherein the inert alkane is chosen from alkanes having 3 to 6 carbon atoms.

5. The process according to claim 1, wherein a thermal run away reducing agent is added to a reaction system comprising the reactor and the cooled recycle stream.

6. The process according to claim 5, wherein the thermal run away reducing agent is chosen from esters, amines, nitriles, amides and mixtures thereof.

7. The process according to claim 1, wherein the liquid comprising stream is added to the expanded section in a circumferential manner.

8. The process according to claim 1, wherein the liquid comprising stream is added to the expanded section via a pipe ring with a plurality of nozzles directed to the interior surface of the expanded section.

9. The process according to claim 1, wherein the alkane is added such that the molar composition of the alkane in the reactor is at least 1 mol %.

10. The process according to claim 1, wherein the reactor is a multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate,
wherein the first zone is separated from the second zone by the distribution plate, wherein the multi-zone reactor is extended in the vertical direction, wherein the second zone of the multi-zone reactor is located above the first zone and wherein the third zone of the multi-zone reactor is located above the second zone, and wherein the fourth zone of the multi-zone reactor is located above the third zone,
wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor,
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor,
wherein the largest diameter of the inner wall of the third zone is larger than the largest diameter of the inner wall of the second zone.

11. The process according to claim 1, wherein the polyolefin is polypropylene.

12. The process according to claim 4, wherein the inert alkane is i-butane.

13. The process according to claim 5, wherein a thermal run away reducing agent is added to the liquid comprising stream.

14. The process according to claim 6, wherein the thermal run away reducing agent is p-ethoxy ethyl benzoate (PEEB).

15. The process according to claim 9, wherein the alkane is added such that the molar composition of the alkane in the reactor is at least 2 mol %.

16. The process according to claim 9, wherein the alkane is added such that the molar composition of the alkane in the reactor is at most 5 mol %.

17. The process according to claim 1, wherein the liquid comprising stream is introduced to the expanded section through a nozzle oriented tangential to the interior surface.

18. The process according to claim 1, wherein a superficial gas velocity in the reactor is at least 1.5 m/s and at most 5 m/s.

19. A process for the continuous preparation of a polyolefin in a reactor from one or more α-olefin monomers of which at least one is ethylene or propylene, wherein the reactor comprises a fluidized bed, a distribution plate located at the lower part of the reactor and an inlet for a recycle stream;

wherein the process comprises
feeding the one or more α-olefin monomers to the reactor
withdrawing the polyolefin from the reactor
circulating fluids from the top of the reactor to the bottom of the reactor, wherein the circulating fluids are compressed using a compressor and subsequently cooled using a heat exchanger to form a cooled recycle stream comprising liquid, and wherein the cooled recycle stream is introduced into the reactor using the inlet for the recycle stream
wherein a part of the cooled recycle stream is drawn to form a liquid comprising stream, wherein the liquid comprising stream is introduced into the expanded section during at least part of the polymerization process.

20. The process according to claim 19, wherein the liquid comprising stream is introduced to the expanded section through a nozzle oriented tangential to the interior surface.

* * * * *